United States Patent
Tukiainen

(10) Patent No.: US 12,031,090 B2
(45) Date of Patent: Jul. 9, 2024

(54) METHOD AND APPARATUS FOR THE MANUFACTURING OF BIOCHAR WITH THERMAL TREATMENT

(71) Applicant: CARBOFEX OY, Turku (FI)

(72) Inventor: Sampo Tukiainen, Ylöjärvi (FI)

(73) Assignee: CARBOFEX OY, Turku (FI)

( * ) Notice: Subject to any disclaimer, the term of this patent is extended or adjusted under 35 U.S.C. 154(b) by 320 days.

(21) Appl. No.: 17/602,357

(22) PCT Filed: Apr. 7, 2020

(86) PCT No.: PCT/FI2020/050226
§ 371 (c)(1),
(2) Date: Oct. 8, 2021

(87) PCT Pub. No.: WO2020/208301
PCT Pub. Date: Oct. 15, 2020

(65) Prior Publication Data
US 2022/0169925 A1    Jun. 2, 2022

(30) Foreign Application Priority Data
Apr. 8, 2019 (FI) .................................. 20195284

(51) Int. Cl.
*C10B 47/44* (2006.01)
*C10B 53/02* (2006.01)
(Continued)

(52) U.S. Cl.
CPC .............. *C10B 47/44* (2013.01); *C10B 53/02* (2013.01); *C10B 57/005* (2013.01); *C10B 57/12* (2013.01);
(Continued)

(58) Field of Classification Search
CPC ......... C10B 47/44; C10B 53/02; C10L 5/447; C10L 2290/02; C10L 2290/50
See application file for complete search history.

(56) References Cited

U.S. PATENT DOCUMENTS

| 2010/0228062 A1 | 9/2010 | Babicki et al. |
| 2014/0183022 A1 | 7/2014 | Daugaard et al. |

(Continued)

FOREIGN PATENT DOCUMENTS

| EP | 2072600 A2 | 6/2009 |
| GB | 2144836 A | 3/1985 |

(Continued)

OTHER PUBLICATIONS

International Search Report and Written Opinion in corresponding International Application No. PCT/FI2020/050226 mailed Jul. 6, 2020 (12 pages).

(Continued)

*Primary Examiner* — Renee Robinson
(74) *Attorney, Agent, or Firm* — Jeffri A. Kaminski; Venable LLP

(57) ABSTRACT

A method and an apparatus for manufacturing, with thermal treatment, biocoal which is non-energent, such as functional as a heat sink, by using a conveyor arrangement housed in an essentially Thompson Converter type process space. A to-be-processed feedstock is conveyed in the process space with the conveyor arrangement, which is closed relative thereto, in a longitudinal direction of the process space. A pyrolysis gas, generated from the to-be-processed feedstock present inside the conveyor arrangement as a result of heat transferring from the process space thereto, is conducted into a combustion chamber included in the process space for burning the gas, a thereby generated flue gas being removed from the process space by a discharge arrangement and a (Continued)

resulting non-energent biocoal being removed from the conveyor arrangement for further processing.

6 Claims, 1 Drawing Sheet

(51) Int. Cl.
    *C10B 57/00*     (2006.01)
    *C10B 57/12*     (2006.01)
    *C10L 5/44*     (2006.01)

(52) U.S. Cl.
    CPC ........... *C10L 5/447* (2013.01); *C10L 2290/02* (2013.01); *C10L 2290/50* (2013.01)

(56) References Cited

U.S. PATENT DOCUMENTS

2015/0144831 A1*   5/2015   Mennell ................. C10B 57/10
                                                                                      252/62.51 R
2019/0367814 A1   12/2019   Brandhorst, Jr. et al.

FOREIGN PATENT DOCUMENTS

WO     2011004073 A1     1/2011
WO     2014152291 A1     9/2014
WO     2018039738 A1     3/2018

OTHER PUBLICATIONS

Buss et al.; "Strategies for producing biochars with minimum PAH contamination"; Journal of Analytical and Applied Pyrolysis, 119, pp. 24-30; Jun. 6, 2016; (doi:10.1016/j.jaap.2016.04.001); 31 pages.
Wang et al.; "Polycyclic aromatic hydrocarbons (PAHs) in biochar—Their formation, occurrence and analysis: A review"; Organic Geochemistry vol. 114; (DOI:10.1016/j.orggeochem.2017.09.001); Sep. 2017; pp. 1-11 (12 pages).
Extended European Search Report in corresponding European Application No. 20786772.2 dated Dec. 5, 2022 (8 pages).

\* cited by examiner

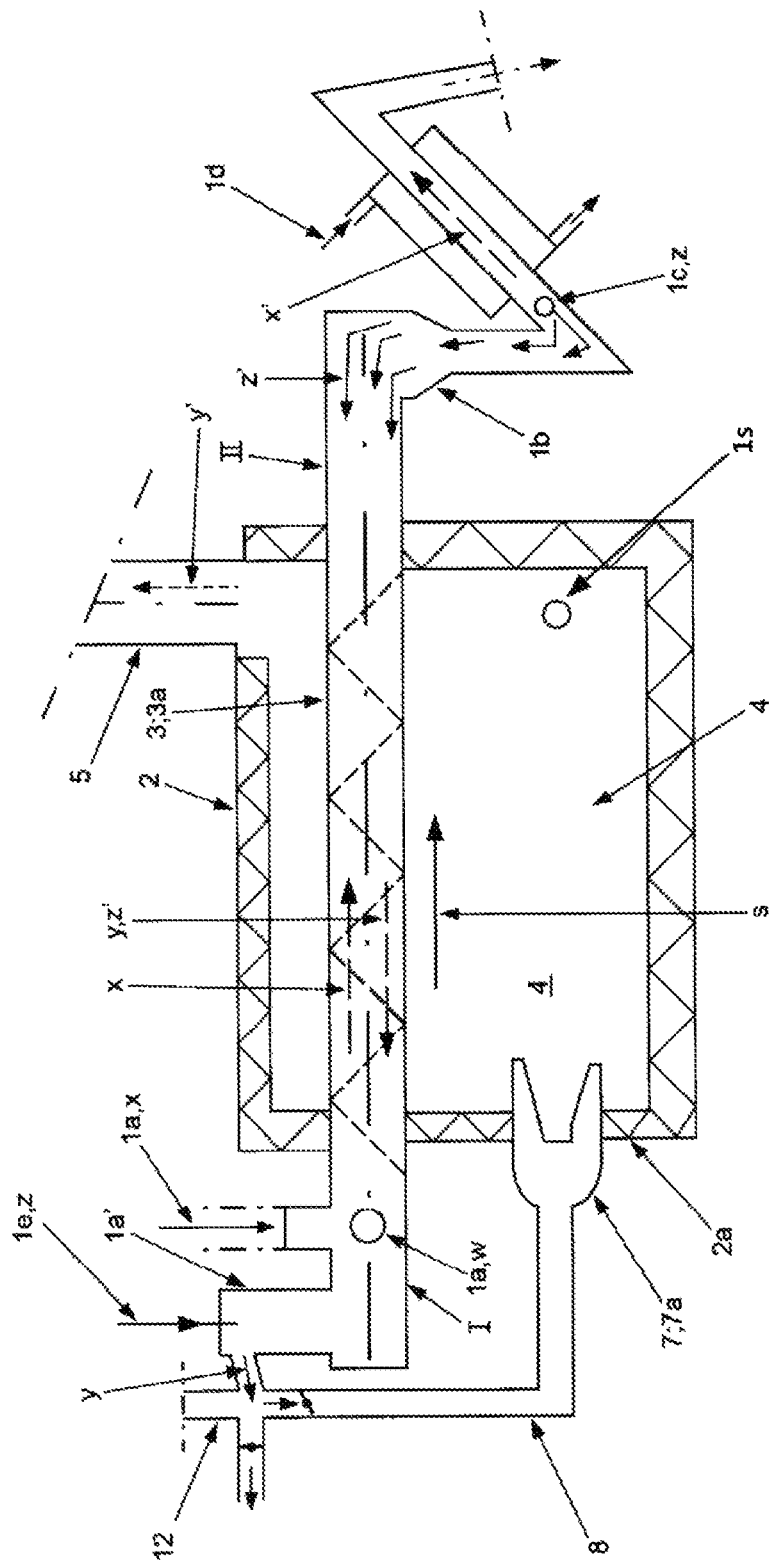

METHOD AND APPARATUS FOR THE MANUFACTURING OF BIOCHAR WITH THERMAL TREATMENT

CROSS-REFERENCE TO RELATED APPLICATIONS

This application is a U.S. National Stage application of PCT/FI2020/050226, filed Apr. 7, 2020 and published on Oct. 15, 2020 as WO 2020/208301, which claims the benefit of Finnish Patent Application No. 20195284 filed Apr. 8, 2019, all of which are hereby incorporated by reference in their entireties.

The invention relates to a method and an apparatus as set forth in the preambles of independent claims directed thereto for manufacturing, with thermal treatment, biochar that is functional e.g. as a so-called carbon sink.

The use of a traditional Thompson Converter type apparatus is based on supplying to-be-processed feedstock to one or more screw conveyors present in a process space included in the apparatus, the to-be-processed feedstock being carried by said conveyor/s in a longitudinal direction of the process space while being heated indirectly at the same time. The feedstock inside the conveyors, carbonized by heat transferring from the latter to the to-be-processed feedstock, is discharged from a second end of the conveyors onto a collecting conveyor which delivers the carbonized feedstock out of the process space. In such a solution, the pyrolysis gas generated inside the screw conveyors migrates traditionally in a traveling direction of and along with the to-be-processed feedstock from a discharge end of the screw conveyors into a collection chamber and therefrom further along a connecting conduit into a combustion furnace below the screw conveyor space for burning. Flue gas discharges from the combustion furnace into the screw conveyor space, wherein the heat contained in the flue gas is delivered by convective heat transfer to the screw conveyors prior to being removed from the process space by way of a discharge unit.

Activating the discussed type of apparatus requires that the combustion furnace be heated in its entirety, e.g. with a solid fuel combustible therein, to a sufficiently high temperature prior to starting the actual carbonization process for enabling the pyrolysis gas to burn and thereafter the process to function in a so-called self-sustaining manner. Therefore, the discussed solution is laborious and slow, especially in terms of initial startup.

Solutions of the foregoing type are also available at present in such implementations that the combustion furnace is provided e.g. with a kerosene burner for maintaining an auxiliary flame, one further implementation being such that pyrolysis gas, conveyed in a direction opposite to a traveling direction of the screw conveyor arrangement, is conducted into a combustion furnace to be burned with the aforementioned burner flame.

The most notable drawback at present in sets of equipment of the foregoing type is a modest "volume efficiency $[W/m^3]$" thereof as a result of indirect or convective heat transfer applied in the heating of screw conveyors. First of all, this prolongs considerably a cold start time for the apparatus before the actual continuous carbonization process can be started. On the other hand, one essential drawback is that the preheating of a furnace space requires either the use a solid fuel for quite a long period of time or else the use of a continuous auxiliary flame produced with a separate fuel for enabling the pyrolysis gas to be burned. Therefore, the current technology is not able to provide a carbon separation process that could be implemented with reasonable investment and operating costs.

For example, the international patent application WO 2011/004073 discloses a method for separating carbon by thermal treatment, in which method matter to be processed is brought by a feed arrangement to a conveyor arrangement connected to a process space that is substantially of a Thompson Converter type. The matter to be processed is made to move in the process space in longitudinal direction thereof by means of a conveyor arrangement closed in relation to the space, whereby pyrolysis gas formed by heat transfer from the process space into the matter to be processed contained in the conveyor system is conveyed inside the conveyor system in a direction opposite to the conveying direction and out of the conveyor system for burning the same in a combustion space provided in the process space. The formed flue gas is discharged from the process space by means of a discharge arrangement and thermally treated matter is discharged by means of discharge elements from the conveyor arrangement for further processing. In this respect, the pyrolysis gas is first of all burned by a continuous gas burner arrangement and, secondly, heat transfer of the conveyor system in the process space is carried out substantially by direct radiation from the flame of the gas burner arrangement and from the walls of the combustion space.

However, even this solution does not as such enable production of biochar in such a way that PAH compounds contained therein would be at a sufficiently low level.

It is an objective of the present method and apparatus according to the invention to provide a decisive improvement regarding the aforementioned problems and to thereby substantially raise the available prior art. In order to accomplish this objective, the method and apparatus of the invention are primarily characterized by what has been presented in the characterizing clauses of independent claims directed thereto.

The most important benefits obtained by a method and apparatus of the invention should be noted to include the simplicity and efficacy of the operating principle thereof, equipment stock suitable for the implementation thereof, and the use thereof. By virtue of the invention it is possible to produce biochar containing a very small amount of PAH compounds, in the best case none at all, which can be accomplished by thermally treating a to-be-processed feedstock inside a conveyor system through the utilization of water vapor generated from water delivered into the conveyor system. The invention is implementable in a technically extremely simple and efficient manner by using, first of all, a continuously operating conveyor arrangement provided with a supply and discharge element that is substantially gastight with respect to the environment. It is thereby that oxygen supply into the pyrolysis gas within the conveyor arrangement can be prevented, whereby said gas, as it travels towards a supply end of the conveyor arrangement in a counterflow principle relative to the to-be-processed feedstock traveling inside the same in a longitudinal direction, cools down effectively as the heat therein transfers into the to-be-processed feedstock moving in an opposite direction, thus enabling the pyrolysis gas to be conducted at an ideal temperature to the gas burner for combustion.

The utilization of a sufficiently large-volume combustion chamber in the process space enables, first of all, the combustion of flue gases with a two-second dwell time at a temperature higher than 850° C. as required by the EU waste incineration derivative. In addition, the conditions presently existing in a rear section of the combustion chamber are favorable for an SNCR (Selective Non-catalytic Reduction) nitrogen reaction, i.e. temperature of 800-1100° C. and oxidizing atmosphere.

The apparatus constructed with a method of the invention has an optimal volume efficiency as the heat transfer to a conveyor arrangement takes place in the process space from the flame of a gas burner/burners with direct radiation heat (radiation heat transfer being proportional to the fourth power of temperature), which first of all expedites the startup of a biochar producing process as the conveyor arrangement's surface temperatures increase with direct radiation from a gas flame considerably more rapidly than with convective heat transfer. Hence, by virtue of the invention it is therefore possible to assemble an apparatus, which is considerably smaller in size and more compact than its presently available counterparts, and whose investment, service and maintenance costs are naturally also decisively more affordable than those of traditional solutions.

Other preferred embodiments for a method and apparatus of the invention are presented in dependent claims directed thereto.

In the subsequent description, the invention will be reviewed in detail with reference to the accompanying drawing, which depicts a general operating principle for the apparatus functioning with a method of the invention.

The invention relates first of all to a method for manufacturing, with thermal treatment, biochar which is functional as a carbon sink, said method comprising introducing a to-be-processed feedstock x with supply elements 1a into the interior of a conveyor arrangement 3, which is present in a Thompson Converter type process space 2 and closed relative thereto, for moving the to-be-processed feedstock x in the process space 2 in a longitudinal direction s of the process space, whereby a pyrolysis gas y, generated from the to-be-processed feedstock x present in the conveyor arrangement 3 as a result of heat transferring thereto from the process space, is conducted away from the conveyor arrangement for burning the same in a combustion chamber 4 of the process space. A resulting flue gas y' is removed from the process space by way of a discharge arrangement 5 and a produced biochar x' is removed from the conveyor arrangement with discharge elements 1b for further processing. Referring particularly to the attached exemplary process flow chart, the pyrolysis gas y is burned with a most preferably continuously operating gas burner arrangement 7 and heat transfer for the conveyor arrangement 3 in the process space 2 is conducted with substantially direct radiation from a flame of the gas burner arrangement 7 and from walls of the combustion chamber 4. In addition, the pyrolysis gas y is conducted within the conveyor arrangement 3 in a counterflow relative to the longitudinal direction s of the process space towards a supply end I of the conveyor arrangement for transferring the heat present in the pyrolysis gas into the to-be-processed feedstock x moving in the longitudinal direction s of the process space and for delivering the cooled pyrolysis gas y to the gas burner arrangement 7. The amount of PAH compounds contained in the to-be-produced biochar x' is reduced/eliminated by means of water vapor z' by supplying water z into the interior of the conveyor arrangement 3, the water z being conducted into the interior of the conveyor arrangement 3 from its discharge end II for carrying the water vapor flow z', jointly with the pyrolysis gas y, in a counterflow relative to the longitudinal direction s of the process space towards the conveyor arrangement's supply end I.

In reference to the attached process flow chart, it is moreover particularly important in applying a method of the invention that the removal of the pyrolysis gas y' takes place in the longitudinal direction s of the process space 2 prior to the supplying 1a the to-be-processed feedstock x. Conducting the aforementioned operations in a wrong order undermines substantially the usability of the process, whereby for example the pipes involved in the aforementioned operations become easily clogged and, when running the process at high capacity, the mass is able to rise into the gas pipe. It is further particularly important for the sound operation of a method of the invention that the surface level of a to-be-processed feedstock inside the conveyor arrangement be controlled carefully, which is absolutely necessary especially from the standpoint of managing pressure and tar accumulation. Another aspect of major importance is the management of pyrolysis gas in terms of its temperature and moisture because, without water supply, the gas pipes will be quickly clogged in practice as long as the to-be-processed feedstock is dry. The moistening of to-be-processed feedstock is in practice a challenging operation, further resulting in the process losing some of its productive capacity, which is avoided by supplying water mist z, according to the attached process flow chart, into the pyrolysis gas y for the management of its moisture and temperature.

It is by conducting a water vapor flow z', jointly with the pyrolysis gas y, in a counterflow relative to the longitudinal direction s of the process space towards the supply end I of the conveyer arrangement that there is provided as effective a process as possible between water vapor z' and to-be-processed feedstock, whereupon, in a further preferred embodiment of the method, the to-be-produced biochar x' is cracked and cooled by the action of water vapor prior to its removal from the conveyor arrangement 3.

In a further preferred embodiment for a method of the invention, the to-be-processed feedstock x is treated in the process space 2 with the conveyor arrangement 3, which is at excess pressure relative thereto and provided with the supply and discharge elements 1a, 1b that are substantially gastight relative to the environment, this being preferably implemented by using one or more electric motor-driven and steplessly adjustable, such as variable-speed driven, screw conveyors 3a or the like.

When supplying the conveyor arrangement 3 with to-be-processed feedstock, it is possible to utilize e.g. the method and supply system according to Finnish patent No. 119125 especially for implementing the supply of to-be-processed feedstock from above to occur first of all in a continuous manner and, on the other hand, in such a way that process gases cannot escape in an uncontrolled manner from inside the conveyor arrangement or from the process space into the environment.

In yet another preferred embodiment, the conveyor arrangement 3 is most effectively heated immediately after its introduction into the process space 2 with one or more gas burners 7; 7a mounted on an entrance wall 2a of the process space in a co-directional relationship with the conveyor arrangement.

In a further preferred embodiment, the transport capacity of a conveyor arrangement 3, such as one or more screw conveyors 3a, can be changed in the longitudinal direction s of the process space especially for reducing the layer thickness of the to-be-processed feedstock x from the supply end I of the conveyor arrangement 3 towards its discharge end II. Hence, the conveyor arrangement 3 is preferably implementable e.g. with a screw conveyor 3a provided at its upstream end with smaller pitch and at its downstream end with a larger pitch.

It is further possible to implement the air supply for a gas burner arrangement 7, such as for one or more parallel gas burners 7a, with a separate combustion air fan. On the other hand, it is further possible, in connection with the gas burner 7a, to also preferably make use of e.g. an ejector fan for sucking the pyrolysis gas y by way of an ejector nozzle into the gas burner.

In a further preferred embodiment, it is also possible with a method of the invention to process mutually dissimilar feedstocks x, w by bringing the same, as indicated e.g. in the attached process flow chart, into the conveyor arrangement by separate supply elements 1a, the feedstocks delivered therefrom blending with each other while being pushed by the screw conveyor 3a towards the process space. In this context, it is naturally also possible to proceed in such a manner that various feedstocks are mixed with each other in a separate mixing space and delivered with a single supply element into the conveyor arrangement 3.

In yet another preferred embodiment, there is executed in the process space a nitrogen reduction, carried out e.g. with a so-called SNCR (Selective Non-catalytic Reduction) method, by using an additional nozzle arrangement is for supplying the combustion chamber 4 with an ammonia-containing medium, such as urea spray, aqueous ammonia solution or the like. By placing the aforementioned nozzle arrangement at a point marking the end of a gas flame burning zone, the medium sprayed by way of the nozzle arrangement evaporates, whereby the resulting ammonia is blended and has time to effect on flue gases long enough for a meaningful nitrogen reaction. Additionally, in a method of the invention, there is further ensured, preferably e.g. with a lambda sensor, that the combustion is permanently provided with excess air.

In a further preferred embodiment of the invention, the supply of additives into the to-be-produced biochar x' is implemented by admixing with the water z to be delivered into the conveyor arrangement 3.

On the other hand, the invention relates also to an apparatus for implementing the aforementioned method, the apparatus including:
  supply elements 1a for introducing a to-be-processed feedstock x into the interior of a conveyor arrangement 3 present in and closed relative to a Thompson Converter type process space 2 for moving the to-be-processed feedstock x in the process space 2 in a longitudinal direction s of the process space,
  a flow arrangement 8 for conducting a pyrolysis gas y, generated from the to-be-processed feedstock x present in the conveyor arrangement 3 as a result of heat transferring thereto from the process space, away from the conveyor arrangement for burning the same in a combustion chamber 4 of the process space,
  a discharge arrangement 5 for removing a resulting flue gas y' from the process space,
  discharge elements 1b for the removal of a produced biochar x' from the conveyor arrangement for further processing, and
  a most preferably continuously operating gas burner arrangement 7 for burning the pyrolysis gas y, whereby the heat transfer for the conveyor arrangement 3 in the process space 2 is adapted to occur with substantially direct radiation from a flame of the gas burner arrangement 7 and from walls of the combustion chamber 4. In addition, the flow of the pyrolysis gas y within the conveyor arrangement 3 takes place in a counterflow towards a supply end I of the conveyor arrangement for transferring the heat present in the pyrolysis gas into the to-be-processed feedstock x moving in an opposite direction s and for delivering the cooled pyrolysis gas y to the gas burner arrangement 7. The apparatus further includes a supply arrangement 1c for conducting water z into the interior of the conveyor arrangement 3, for reducing/eliminating by means of water vapor z' the amount of PAH compounds contained in the to-be-produced biochar x', the supply arrangement 1c being adapted to conduct the water into the interior of the conveyor arrangement 3 essentially to a discharge end II of the conveyor arrangement for carrying a water vapor flow z', jointly with the pyrolysis gas y, in the longitudinal direction s of the process space towards the conveyor arrangement's supply end I.

Referring to the attached process flow chart, it is in a preferred embodiment of the invention that a discharge pipe 1a' for pyrolysis gas is disposed in a longitudinal direction upstream of the to-be-processed feedstock supply arrangement 1a. In the attached process flow chart there is further presented a supply arrangement 1e for delivering water mist into the pyrolysis gas y' for adjusting its moisture and temperature. In addition, the apparatus preferably includes a cooling arrangement 1d for cooling the produced biochar x' with a water/water vapor z' circulation implemented preferably on the counterflow principle.

In a further preferred embodiment of the apparatus, it comprises a conveyor arrangement 3, which is housed in the process space 2, is at excess pressure relative thereto, and is provided with the supply and discharge elements 1a, 1b substantially gastight relative to the environment, the benefits associated therewith having already been described above.

It is obvious that the invention is not limited to the embodiments presented or described above, but can be varied within the basic concept of the invention so as to comply with given intended uses and applications. Accordingly, it is first of all clear that, with regard to the combustion process, the method can be conducted by making use of per se conventional control technology and automation e.g. with oxygen analyzers and temperature sensors needed in the combustion of pyrolysis gas and/or by using e.g. a preheating burner. Respectively, for the processing of to-be-processed feedstock it is possible to provide the screw conveyor arrangement with necessary monitoring arrangements for enabling optimal carbonization and final temperature e.g. by stepless regulation of the screw conveyor arrangement's operation. It is naturally possible that the apparatus applying a method of the invention be preferably further provided e.g. with optical flame monitoring analyzers and e.g. with a "torch tube" 12 according to the drawings, which is connected to the conveyor arrangement and by which the pyrolysis gas can be released, if necessary, by combustion with a separate burner, the torch tube thereby functioning as a relief valve enabling a rapid emergency switch-off of the apparatus.

The invention claimed is:
1. A method for manufacturing, with thermal treatment, biochar which is functional as a carbon sink, said method comprising:
  supplying a to-be-processed feedstock with supply elements into an interior space of a conveyor arrangement, the conveyor arrangement being present in a process space of a Thompson Converter type, the conveyor arrangement being enclosed relative to the process space, for moving the to-be-processed feedstock in the conveyor arrangement within the process space in a longitudinal direction of the process space, whereby a pyrolysis gas, generated from the feedstock being processed in the conveyor arrangement as a result of heat transferring thereto from the process space, is being conducted away from the conveyor arrangement for burning the pyrolysis gas with a continuously operating gas burner arrangement in a combustion chamber of the process space to produce the biochar within the conveyor arrangement, wherein the heat transfer for the conveyor arrangement in the process space is conducted with a direct radiation from a flame of the gas burner and from walls of the combustion chamber, and whereby a resulting flue gas is being removed from the combustion chamber in the process space by way of a discharge arrangement, and wherein a produced biochar is being removed from the conveyor arrangement with discharge elements for further processing, and whereby the pyrolysis gas is conducted within the conveyor arrangement in a counterflow relative to the longitudinal direction of the process space towards a supply end of the conveyor arrangement for transferring the heat present in the pyrolysis gas into the to-be-processed feedstock moving in the longitudinal direction of the process space, wherein the heat transfer cools down the pyrolysis gas, and the cooled pyrolysis gas is delivered to the gas burner arrangement, wherein water is being supplied into the interior of the conveyor arrangement, generating water vapor, wherein the water is being conducted into the interior of the conveyor arrangement from its discharge end for generating water vapor therein, the water vapor flow being carried jointly with the pyrolysis gas, in a counterflow relative to the longitudinal direction of the process space towards the conveyor arrangement's supply end to reduce the amount of PAH compounds in the processed biochar, and wherein the pyrolysis gas is removed in the longitudinal direction of the process space upstream of supplying the to-be-processed feedstock to avoid clogging of pipes.

2. The method according to claim 1, wherein the produced biochar is cracked and cooled by the action of water vapor upstream of its removal from the conveyor arrangement.

3. The method according to claim 1, wherein the processed feedstock is treated in the conveyor arrangement within the process space, wherein the conveyor arrangement is at excess pressure relative to the process space and provided with the supply and discharge elements that are gastight relative to the environment.

4. The method according to claim 1, wherein supply of additives into the produced biochar is implemented by admixing the additives with the water being delivered into the conveyor arrangement.

5. An apparatus for manufacturing biochar with thermal treatment, said apparatus including:

supply elements for introducing a to-be-processed feedstock into an interior of a conveyor arrangement, the conveyor arrangement being present in and closed relative to a process space of a Thompson Converter type for moving the to-be-processed feedstock in the process space in a longitudinal direction of the process space, a flow arrangement for conducting a pyrolysis gas, generated from the to-be-processed feedstock present in the conveyor arrangement as a result of heat transferring thereto from the process space, away from the conveyor arrangement for burning the pyrolysis gas in a combustion chamber of the process space to produce the biochar within the conveyor arrangement, a discharge arrangement for removing a resulting flue gas from the process space, discharge elements for the removal of a produced biochar from the conveyor arrangement for further processing, and a continuously operating gas burner arrangement for burning the pyrolysis gas, whereby the heat transfer for the conveyor arrangement in the process space is adapted to occur with direct radiation from a flame of the gas burner arrangement and from walls of the combustion chamber, and whereby the pyrolysis gas is conducted within the conveyor arrangement in a counterflow towards a supply end of the conveyor arrangement for transferring the heat present in the pyrolysis gas into the to-be-processed feedstock moving in an opposite direction, wherein the heat transfer cools down the pyrolysis gas, and the cooled pyrolysis gas is delivered to the gas burner arrangement, wherein the apparatus includes a supply arrangement for conducting water into the interior of the conveyor arrangement, for reducing by means of water vapor the amount of PAH compounds contained in the to-be-produced biochar, said supply arrangement being adapted to conduct the water to a discharge end of the conveyor arrangement for carrying the vapor flow, jointly with the pyrolysis gas, in a counterflow relative to the longitudinal direction of the process space towards the conveyor arrangement's supply end, wherein the supply arrangement is adapted to discharge the pyrolysis gas in the longitudinal direction of the process space upstream of supplying the to-be-processed feedstock.

6. The apparatus according to claim 5, wherein said conveyor arrangement, which is housed in the process space, and which is at excess pressure relative to the process space, and is provided with the supply and discharge elements gastight relative to the environment.

* * * * *